US012158128B1

(12) United States Patent
Pillarisetti et al.

(10) Patent No.: US 12,158,128 B1
(45) Date of Patent: Dec. 3, 2024

(54) FUEL INJECTOR CONTROL SYSTEM AND METHOD

(71) Applicant: Caterpillar Inc., Peoria, IL (US)

(72) Inventors: Satya Naga Deepak Pillarisetti, Normal, IL (US); Mitchell B. Juchems, Eureka, IL (US); Pierson Klein, Traverse City, MI (US); Lifeng Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/324,803

(22) Filed: May 26, 2023

(51) Int. Cl.

| | |
|---|---|
| ***F02M 51/06*** | (2006.01) |
| ***F02D 41/20*** | (2006.01) |
| ***F02D 41/40*** | (2006.01) |
| *F02M 61/18* | (2006.01) |

(52) U.S. Cl.
CPC ........... *F02M 51/061* (2013.01); *F02D 41/20* (2013.01); *F02D 41/401* (2013.01); *F02M 61/18* (2013.01)

(58) Field of Classification Search
CPC ...... F02M 51/061; F02M 61/04; F02M 61/18; F02M 51/0653; F02D 41/20; F02D 41/401
See application file for complete search history.

(56) References Cited

U.S. PATENT DOCUMENTS

| | | | | |
|---|---|---|---|---|
| 5,676,114 | A | 10/1997 | Tarr et al. | |
| 5,752,659 | A | 5/1998 | Moncelle | |
| 6,167,869 | B1 | 1/2001 | Martin et al. | |
| 2005/0167523 | A1 * | 8/2005 | Haji | F02M 59/105 239/88 |
| 2010/0096473 | A1 * | 4/2010 | Coldren | F02M 63/0063 239/90 |
| 2015/0369160 | A1 | 12/2015 | Tanis et al. | |
| 2016/0123286 | A1 * | 5/2016 | Hou | F02M 45/086 123/304 |

* cited by examiner

*Primary Examiner* — Syed O Hasan
(74) *Attorney, Agent, or Firm* — Bookoff McAndrews, PLLC

(57) ABSTRACT

An electronically controlled fuel injector includes an injection valve; a control valve fluidly connected between a pressurized fuel supply passage and a control chamber for controlling operation of the injection valve, the control valve movable between a non-injection position and an injection position; the injection valve configured to inject fuel with the control valve in the injection position; and a control member chamber including an orifice that fluidly connects the control member chamber with a low pressure return line of a fuel supply system. The control chamber is fluidly coupled with a pressure communication passage such that the control chamber is fluidly coupled with the low pressure return line through the orifice in the control member chamber when the control valve is in the injection position. The pressure communication passage includes a two-way, variable flow rate valve.

20 Claims, 5 Drawing Sheets

FUEL INJECTOR CONTROL SYSTEM AND METHOD

TECHNICAL FIELD

The present disclosure relates generally to methods and systems for internal combustion engine components and, more particularly, to systems and methods for a fuel injection system with multiple solenoids and a check restricting orifice.

BACKGROUND

Mechanically actuated electronically controlled unit injectors (MEUI) are used in internal combustion engines, including compression ignition engines. MEUI fuel injectors can be actuated via rotation of a cam, which may be driven via an engine's crankshaft. Fuel pressure in the fuel injector will generally remain low between injection events. As a lobe of the cam lobe begins to move a plunger of the injector, fuel is initially displaced at low pressure to a drain via the spill valve for recirculation. When it is desired to increase pressure in the fuel injector to injection pressure levels, a first electrical actuator is energized to close a spill valve, preventing fuel from draining. When this is done, pressure quickly begins to rise in the fuel injector. Fuel injection commences by energizing a second electrical actuator to relieve pressure on a closing hydraulic surface associated with a needle valve. In some situations, hydraulic fluids can change pressure more quickly than desired or expected, resulting in the injection of fuel quantities that are different than a target quantity.

U.S. Pat. No. 5,752,659 ("the '659 patent") discloses a direct operated velocity-controlled nozzle valve for a fluid injector, in which the fuel injector also includes a low-pressure fuel passage or fuel drain and a damping port that prevents the build-up of pressure in the upper check lift chamber and allows any fuel which leaks around the check lift piston from the lower check lift piston to drain. However, the '659 patent does not disclose a check restricting mechanism for controlling the timing of injection.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, an electronically controlled fuel injector includes an injection valve; a control valve fluidly connected between a pressurized fuel supply passage and a control chamber for controlling operation of the injection valve, the control valve movable between a non-injection position and an injection position; the injection valve configured to inject fuel with the control valve in the injection position; and a control member chamber including an orifice that fluidly connects the control member chamber with a low pressure return line of a fuel supply system. The control chamber is fluidly coupled with a pressure communication passage that extends between the control chamber and the control member chamber such that the control chamber is fluidly coupled with the low pressure return line through the orifice in the control member chamber when the control valve is in the injection position, and the pressure communication passage includes a two-way, variable flow rate valve that inhibits flow in a first direction through the two-way, variable flow rate valve and permits flow in a second direction through the two-way, variable flow rate valve to control an injection rate of the injection valve.

In another aspect, a fuel injector includes an injection valve; a control valve fluidly connected between a pressurized fuel supply passage and a control chamber for controlling operation of the injection valve, the control valve movable between a non-injection position and an injection position; the injection valve configured to inject fuel with the control valve in the injection position; and a control member chamber including at least one orifice that fluidly connects the control member chamber with a low pressure return line of a fuel supply system. The control member chamber comprises a primary volume and a throttling volume, the throttling volume being fluidly coupled with the low pressure return line of the fuel supply system.

In yet another aspect, a method of operating an engine system includes operating a control valve that is fluidly connected between a pressurized fuel supply passage and a needle control chamber, operation including: providing high pressure fuel to the needle control chamber to keep a needle valve in place, preventing fuel injection through the needle valve; and allowing the high pressure fuel to escape the needle control chamber through a pressure communication passage to a control member chamber including an orifice that fluidly connects the control member chamber with a low pressure return line of a fuel supply system to fluidly connect the needle control chamber with the low pressure return line to allow the needle valve to perform a controlled opening. The pressure communication passage includes a two-way, variable flow rate valve that inhibits flow in a first direction and permits flow in a second direction to control an injection rate of the injection valve, the variable flow rate valve including a larger diameter channel and a smaller diameter channel.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
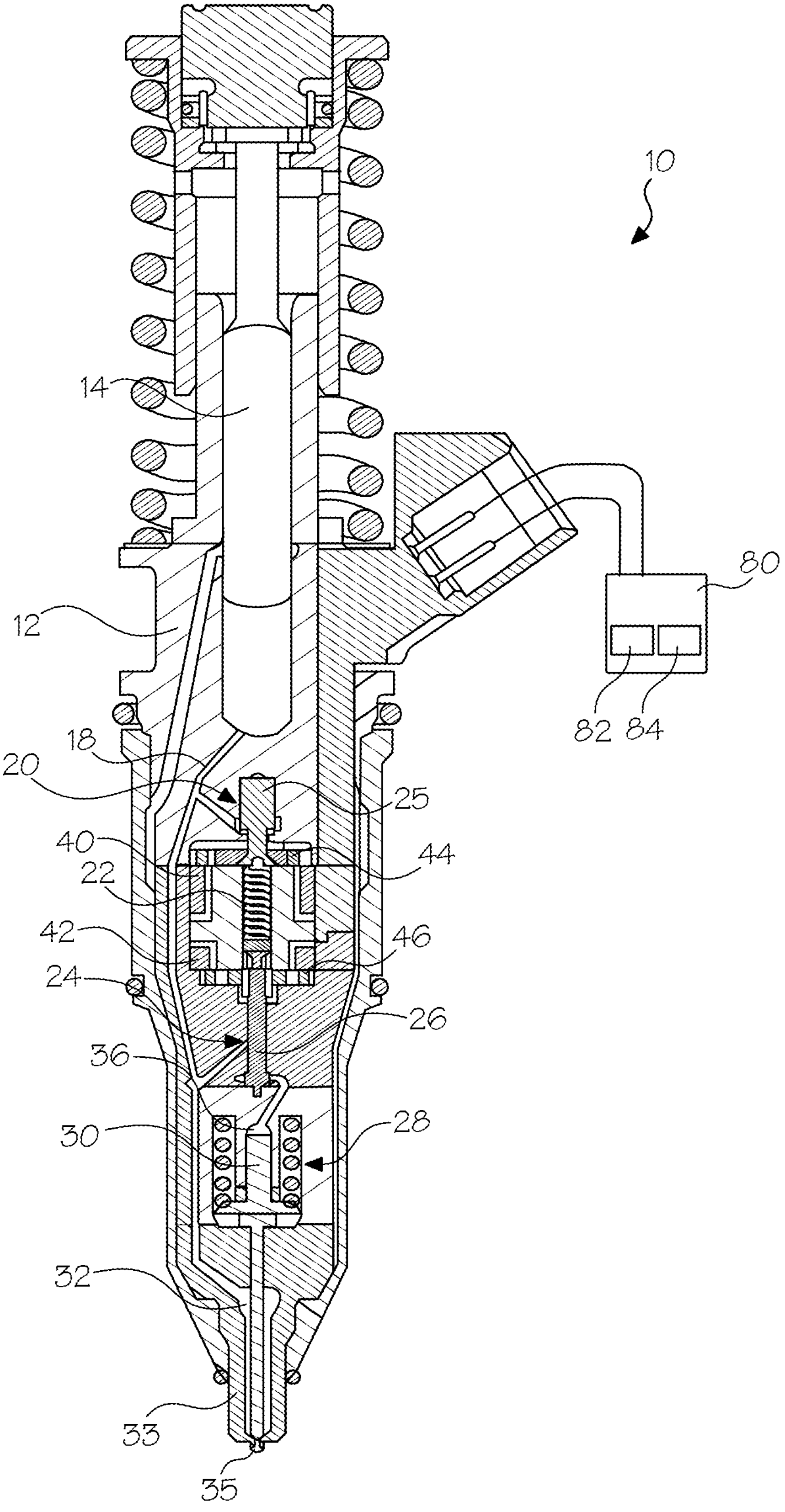
FIG. 1 is a partially schematic cross-sectional view of a fuel injection system, according to aspects of the disclosure.

FIG. 1 illustrates an exemplary fuel injector control system (also referred to as "fuel injection system") 10 according to aspects of the present disclosure. Fuel injection system 10 may include a plurality of fuel injectors 12 (one shown) installed in an internal combustion engine, and an electronic control module (ECM) 80 connected to each injector 12. Fuel injector 12 may include a plurality of valves, these valves being responsive to commands generated with ECM 80, as described below.

Each fuel injector 12 may be a hydraulically or mechanically-actuated electronically-controlled unit injector including a body that houses a cam-driven piston 14, a fuel passage 18 to receive pressurized fuel, a spill valve 20, a control valve 24, and an injection valve 28. Spill valve 20 may be a normally-open valve including a valve member 25 that is movable between an open position and a closed position. A spring member 22 may act to bias spill valve member 25 to the open position. When the valve member 25 is in the open position, spill valve 20 may allow fuel to drain and return to the fuel supply system. When spill valve member 25 is in the closed position, spill valve 20 may enable pressurization of fuel via the piston 14 of injector 12. Spill valve 20 may include a spill valve solenoid 40 for actuating spill valve member 25 due to movement of a spill valve armature 44 to which member 25 is connected. Spill valve solenoid 40 may be energized in response to commands from ECM 80, the energized state generating a magnetic field to move spill valve 20 to the closed position via spill valve armature 44.

Control valve 24 may be connected between pressurized fuel supply passage 18 and a needle control chamber 36. Control valve 24 may have a non-injection position and an injection position associated with a control valve member 26. When in the non-injection position, control valve member 26 may enable fluid communication between the high pressure fuel supply through the needle control chamber 36 enabling high pressure fuel to pressurize a top hydraulic surface 31 of needle valve member 30, preventing the needle valve member 30 from opening and thus preventing fuel injection through the injection valve 28. When control valve member 26 is in the injection position, needle control chamber 36 may be depressurized by allowing fuel in needle control chamber 36 to drain from fuel injector 12 to the low pressure side of the fuel supply system through one or more orifices (not depicted in FIG. 1). Fuel may drain through the orifices at a controlled rate based on one or more structures in fluid communication with the needle control chamber 36 and the fuel supply system. The orifices and other structures controlling the drainage rate from the needle control chamber 36 are explained in greater detail herein. Control valve 24 may be brought to the injection position due to electromagnetic force created by supplying current to control valve solenoid 42.

Injection valve 28 may be a one-way mechanical valve formed with a spring, a needle valve member 30 biased by the spring to a closed position, and needle control chamber 36. Valve member 30 may extend to a distal end of injector 12 which includes a nozzle 33 that terminates in injector openings 35. Injector openings 35 of nozzle 33 may be opened and closed by the distal end of valve member 30. When high-pressure fluid is present in needle control chamber 36, valve member 30 may be secured in a closed position, even when pressurized fuel is present in injection chamber 32. When injection is desired, fluid may be permitted to drain from needle control chamber 36, as described below, allowing pressurized fuel to lift valve member 30 by acting on the lower hydraulic surface (not shown) of valve member 30.

ECM 80 may be a fuel injector control module that controls one or more aspects of system 10, including the behavior of an internal combustion engine and, if desired, behavior of one or more systems of a machine in which system 10 is located. ECM 80 may include a memory 82 and one or more processors 84 to perform the functions described herein. ECM 80 may be implemented as a single control unit that monitors and controls all fuel injectors 12 of system 10. Alternatively, ECM 80 may be implemented as a plurality of distributed control modules in communication with each other.

ECM 80 may be enabled, via programming, to generate commands that control fuel injection events. These commands may result in the supply of electrical energy (e.g., as a desired current waveform), the electrical energy resulting from the commands being monitored by ECM 80. Current monitored by ECM 80 may be supplied, via respective drive circuits, to solenoids 40 and 42.

ECM 80 may embody a single microprocessor or multiple microprocessors that receive inputs and generate outputs. ECM 80 may be configured to monitor a plurality of fuel injectors and change fuel injection quantities and timings. ECM 80 may include memory 82, as well as a secondary storage device, processor 84, such as a central processing unit, or any other means for accomplishing a task consistent with the present disclosure. Memory 82 or a secondary storage device associated with ECM 80 may store data and software to allow ECM 80 to perform its functions. Various other known circuits may be associated with ECM 80, including signal-conditioning circuitry, communication circuitry, and other appropriate circuitry.

Figure 2:
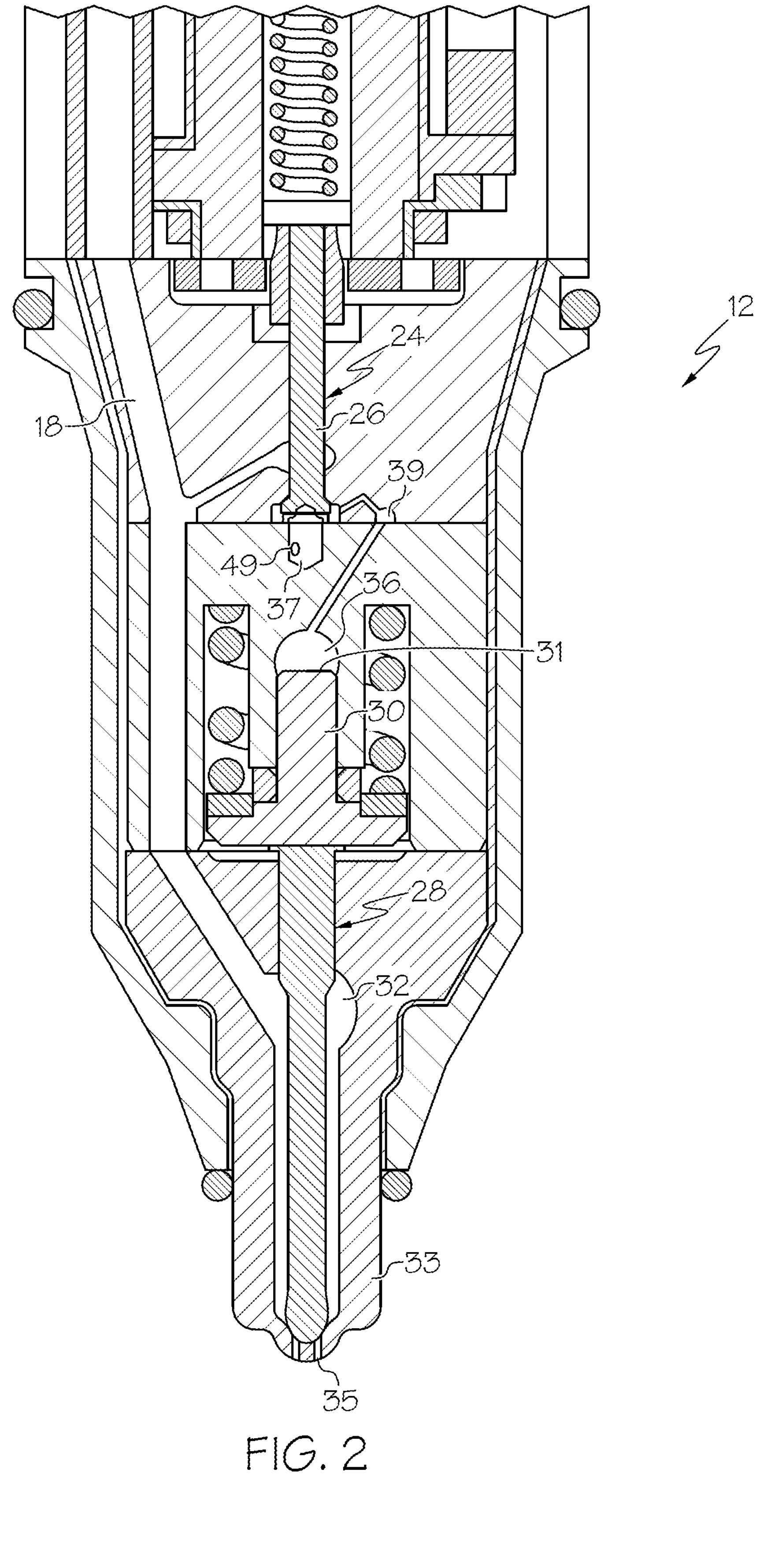
FIG. 2 is a cross-sectional view of the fuel injection system of FIG. 1.

FIG. 2 illustrates further details of fuel injection system 10. As shown in FIG. 2, the valve 24 includes a control member chamber 37 that is selectively in fluid communication with the needle control chamber 36 through a pressure communication passage 39. The control member chamber 37 includes an orifice 49, which fluidly couples the control member chamber 37 to the fluid supply system at a relatively low pressure via a fluid return line to return operating fluid from the control member chamber 37 to the fluid supply system. The control member chamber 37 can be of any dimensions (e.g., volume) suitable for system operation. The orifice 49 and fluid return line are designed to achieve particular operating characteristics to affect the timing of the injection as described in greater detail herein.

Figure 3A:
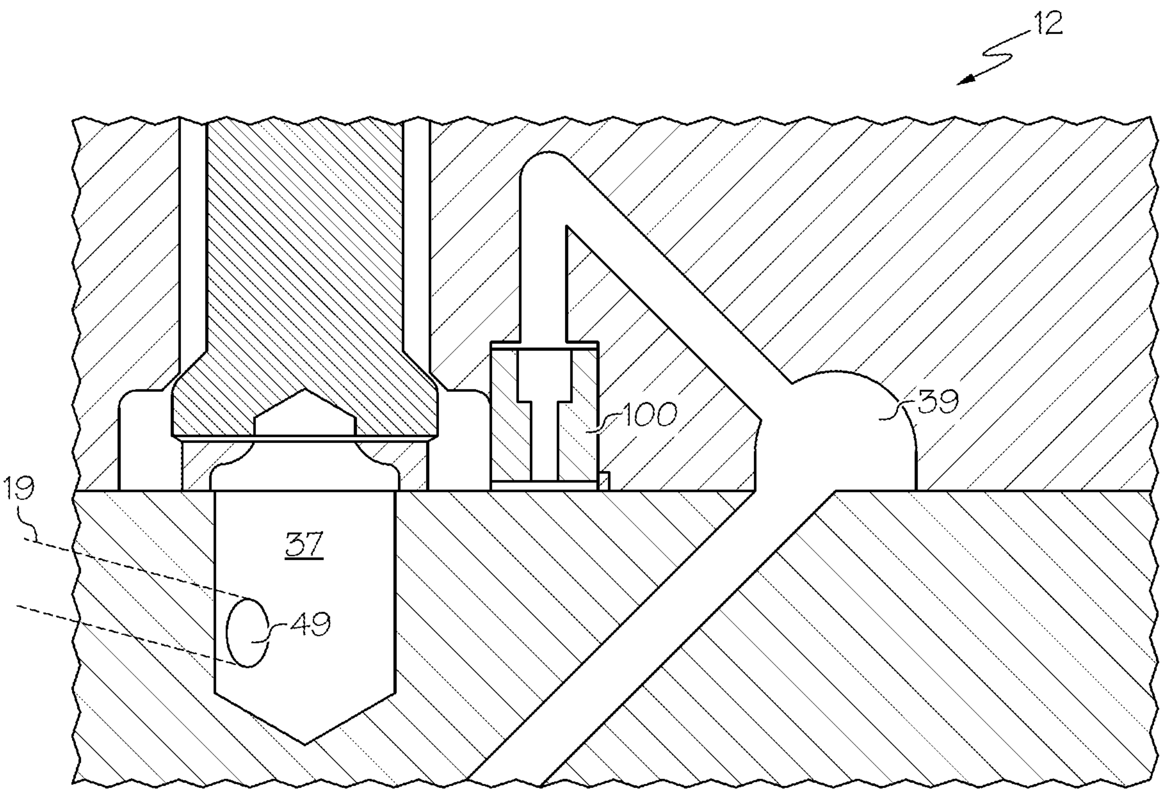
FIG. 3A is a partially schematic cross-sectional view of one embodiment of a fuel injection system including a check restricting orifice.

When control valve 24 is in the non-injection position, control valve member 26 may rest on a valve seat formed around chamber 37, as shown in FIG. 2 (also shown in FIG. 3A). Conversely, when control valve 24 is in the injection position, control valve member 26 may be raised from the position shown in FIG. 2 and unseated from the valve seat around chamber 37. With control valve member 26 in the unseated position, the needle control chamber 36 may be fluidly connected with the control member chamber 37 through the pressure communication passage 39. In this state, fluid holding the injection valve 28 shut with high pressure on the top surface 31 of the injection valve 28 is free to flow to the fluid return line through the pressure communication passage 39 and the orifice 49 in the control member chamber 37. Thus, when the control member 26 is unseated, the injection valve 28 can open, allowing fuel to be injected through the openings 35 to an engine.

Figure 3B:
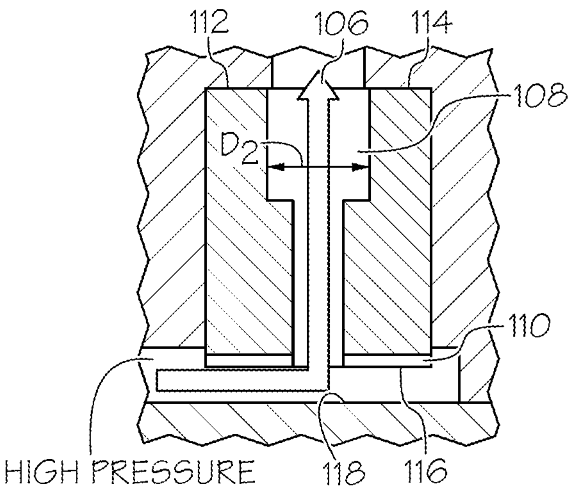
FIG. 3B is an enlarged view of the fuel injection system of FIG. 3A.
Figure 3C:
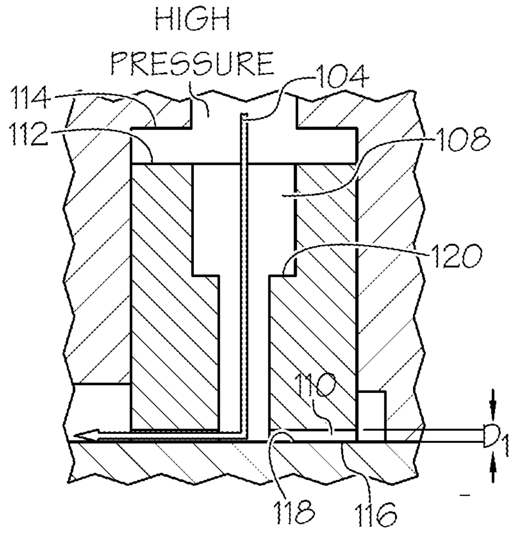
FIG. 3C is a second enlarged view of the fuel injection system of FIG. 3A.

Referring to FIG. 3A, FIG. 3B, and FIG. 3C, an embodiment of a fuel injector 12 including a check restricting orifice valve 100 for restricting flow through the pressure communication passage 39 is shown. The check restricting orifice valve 100 may be a two-way, variable flow rate valve configured to restrict or inhibit flow in a first direction 104 (FIG. 3C) and to permit flow in a second direction 106 (FIG. 3B). For example, the pressurized fuel within the needle control chamber 36 may, with the check restricting orifice valve 100, affect the needle valve member 30 and thereby control the speed of injection through the injection valve 28 by flowing through a larger diameter channel 108 and a smaller diameter channel 110. The terms "inhibit" and "permit" are used herein with respect to one another to describe the flow of pressurized fluid through embodiments of the check restricting orifice valve with the inhibited flow of fluid being at a lower rate than the permitted flow of fluid. Thus, flow may be permitted when flowing through pressure communication passage 39 at a relatively faster rate, and flow may be inhibited when flowing through pressure communication passage 39 at a relatively slower rate.

The check restricting orifice valve 100 may be configured to move between a restrictive position for inhibiting flow, as shown in FIG. 3C, and a permissive position for permitting flow, as shown in FIG. 3B. With the check restricting orifice valve 100 in the permissive position, a top surface 112 of a body of valve 100 may be seated up against a seating surface 114 of the pressure communication passage 39, while a bottom surface 116 of the body of the check restricting orifice valve 100 is spaced apart from a bottom seating surface 118 of passage 39. This may result in a larger cross sectional area for high pressure fluid to flow through (e.g., due to the increased space between bottom surface 116 and bottom seating surface 118). In this embodiment, the two directions of flow through the body of the valve 100 may entirely overlap (e.g., both flows are along an axial direction defined by the valve 100).

As shown in FIG. 3C, when the high pressure fluid does not act on the bottom surface 116 of the check restricting orifice valve 100, the high pressure fluid remaining in the needle control chamber 36, and/or gravity, may cause the check restricting orifice valve 100 to seat in the restrictive position. While in this restrictive position, bottom surface 116 may contact bottom seating surface 118, with channel 110 forming a radially-extending recess between surfaces 116 and 118, such that the fluid flows through the smaller diameter channel 110 into the control member chamber 37. Fluid from control member chamber 37 may then flow to the relatively low pressure fuel supply through the orifice 49.

In some embodiments, the smaller diameter channel 110 may be a triangular or hemispherical channel milled in an end face of the check restricting orifice valve 100, enabling flow of fluid while the bottom surface 116 contacts seating surface 118. For example, channel 110 may have a triangular or hemispherical shape when viewed from the side (e.g., from a radial direction). In some embodiments, the larger diameter channel 108 may be an orifice near or at a center of the check restricting orifice valve 100, the larger diameter channel 108 being cylindrical in shape or generally cylindrical (e.g., including a tapering portion) in shape. The larger diameter channel 108 may be milled to shoulder 120 in the check restricting orifice valve 100 and may have one or more diameters along its length dimension. For example, a diameter of channel 108 may define a distance $D_2$ that is greater than a distance $D_1$ formed between a bottom of the channel 110 and seating surface 118 when the valve 100 contacts surface 118.

In embodiments, the check restricting orifice valve 100 may tend to be in the restrictive position at the beginning of injection (e.g., due to gravity acting on valve 100), the restrictive position slowing the rate at which high pressure fluid can escape the needle control chamber 36, and thus slowing the opening of the needle valve 30 and slowing a start of injection timing. In some embodiments, a flow path of high pressure fluid through the valve 100 may include one or more turns, for example, an approximately ninety-degree turn as shown in FIG. 3B and FIG. 3C, such that the directions of flow do not fully overlap each other. Other turn radiuses are considered within the scope of the embodiments.

Figure 4A:
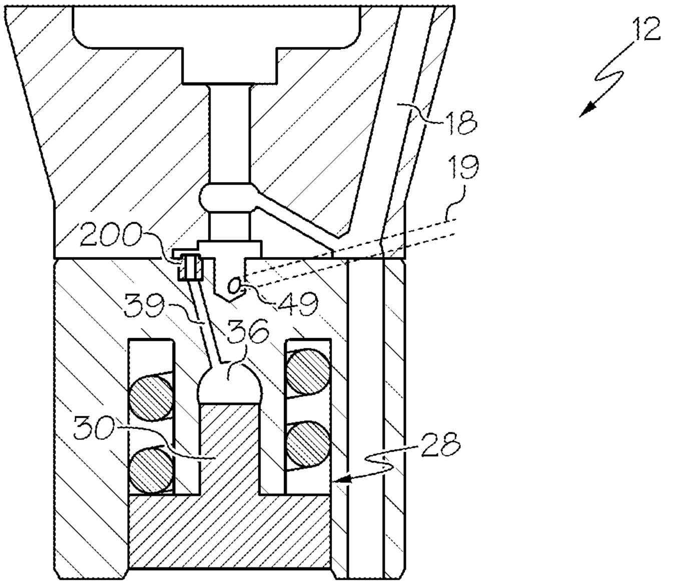
FIG. 4A is a schematic cross-sectional view of another embodiment of a fuel injection system including a check restricting orifice.
Figure 4B:
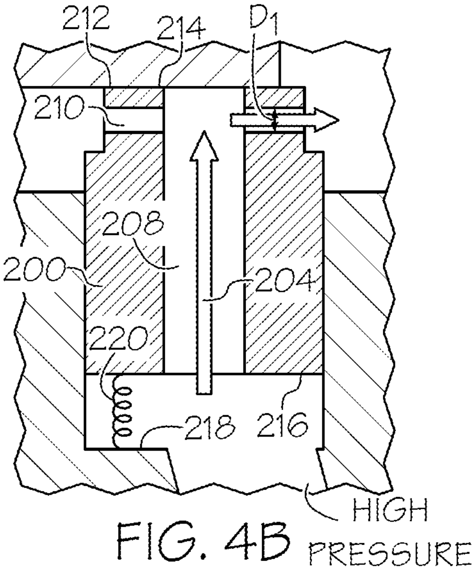
FIG. 4B shows further details of the embodiment of FIG. 4A.
Figure 4C:
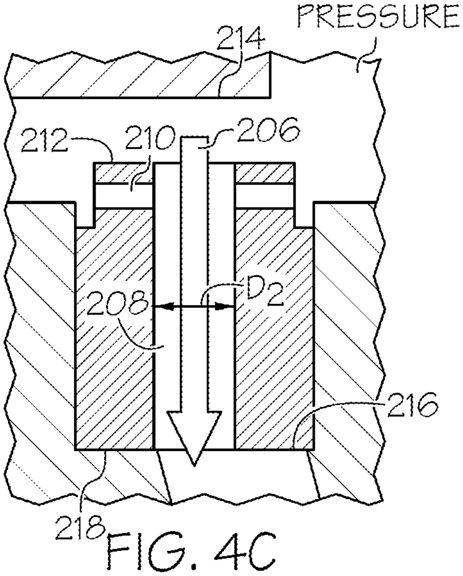
FIG. 4C shows further details of the embodiment of FIG. 4A.
Figure 4D:
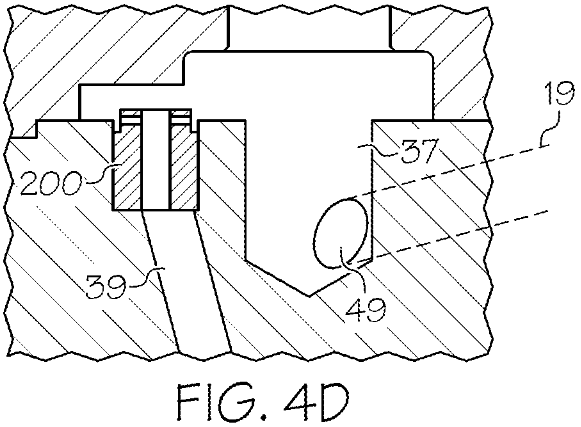
FIG. 4D shows further details of the fuel injection system of FIG. 4A.

Referring now to FIGS. 4A-4D, an embodiment of a fuel injector 12 including a check restricting orifice valve 200 for restricting flow through the pressure communication passage 39 is shown. The check restricting orifice valve 200 may be a two-way, variable flow rate valve that tends to inhibit flow in a first direction 204 (FIG. 4B) and to permit flow in a second direction 206 (FIG. 4C). As the pressurized fuel within the needle control chamber 36 affects the needle valve member 30, the valve 200 may enable control over the speed of injection through the injection valve 28 by causing fuel to flow through a larger diameter channel 208 and, under some situations, through a smaller diameter channel 210. The larger diameter channel 208 and the smaller diameter channel 210 may be perpendicular and/or fluid may flow through the check restricting orifice valve 200 at an approximately ninety-degree angle or otherwise turn within valve 200. A diameter $D_1$ (FIG. 4B) reflects the relatively smaller diameter of channel 210, while a diameter $D_2$ (FIG. 4C) reflects the relatively larger diameter of channel 208.

The check restricting orifice valve 200 may be configured to move between a restrictive position, as shown in FIG. 4B and a permissive position, as shown in FIG. 4C. Alternatively, the check restricting orifice valve 200 is permanently secured in a particular position (e.g., the position shown in FIG. 4C). With the check restricting orifice valve 200 in the permissive position, a top surface 212 may be pressed against a seating surface 214 of the pressure communication passage 39 and a bottom surface 216 of the check restricting orifice valve 200 is off of a bottom seating surface 218, thereby creating a larger cross sectional area (e.g., in accordance with a distance above the surface 212 as shown in FIG. 4C, in comparison to distance $D_1$ as shown in FIG. 4B) for high pressure fluid to flow through.

In some embodiments, the check restricting orifice valve 200 may be biased in a restrictive position by a biasing mechanism 220, biasing the check restricting orifice valve 200 against the force of gravity, which may tend to place the check restricting orifice valve 200 in the restrictive position. The biasing mechanism 220 can be, for example, a spring. Not all embodiments include a biasing mechanism 220, as movement of valve 200 may be accomplished due to the force generated by the flow of fluid.

When high pressure fluid is ported from the high pressure supply 18 to the needle control chamber 36 (FIG. 2), the high pressure fluid tends to hold the check restricting orifice valve 200 in the permissive position shown in FIG. 4C. At the start of injection, the supply of high pressure fluid is decoupled from the needle control chamber 36 by the operation of the control valve member 26 (not shown in FIG. 4A for simplicity). At this time, the check restricting orifice valve 200 tends to inhibit the flow of the remaining high pressure fluid in the needle control chamber 36 to the control member chamber 37 through the pressure communication passage 39 and out through the orifice 49. For example, this flow of high pressure fluid in chamber 36 may be slowed because the check restricting orifice valve 200 is seated against the seating surface 214, inhibiting flow through the control member chamber 37 and into the relatively low pressure fuel supply system. Subsequently, when injection is finished and high pressure fluid is again ported through the pressure communication passage 39 to the needle control chamber 36, the check restricting orifice may seat against the bottom seating surface 218 in the permissive position, while the high pressure fluid causes the injection valve 28 to close.

Figure 5B:
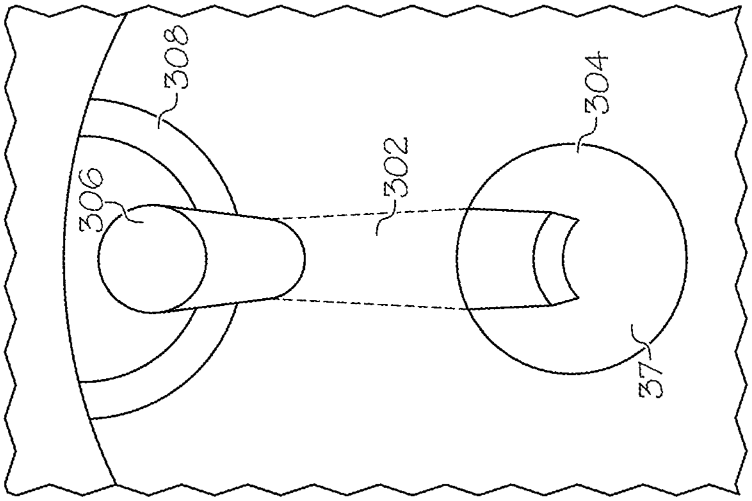
FIG. 5B is a top view that shows further details of the embodiment of the check restricting orifice of FIG. 5A.
Figure 5A:
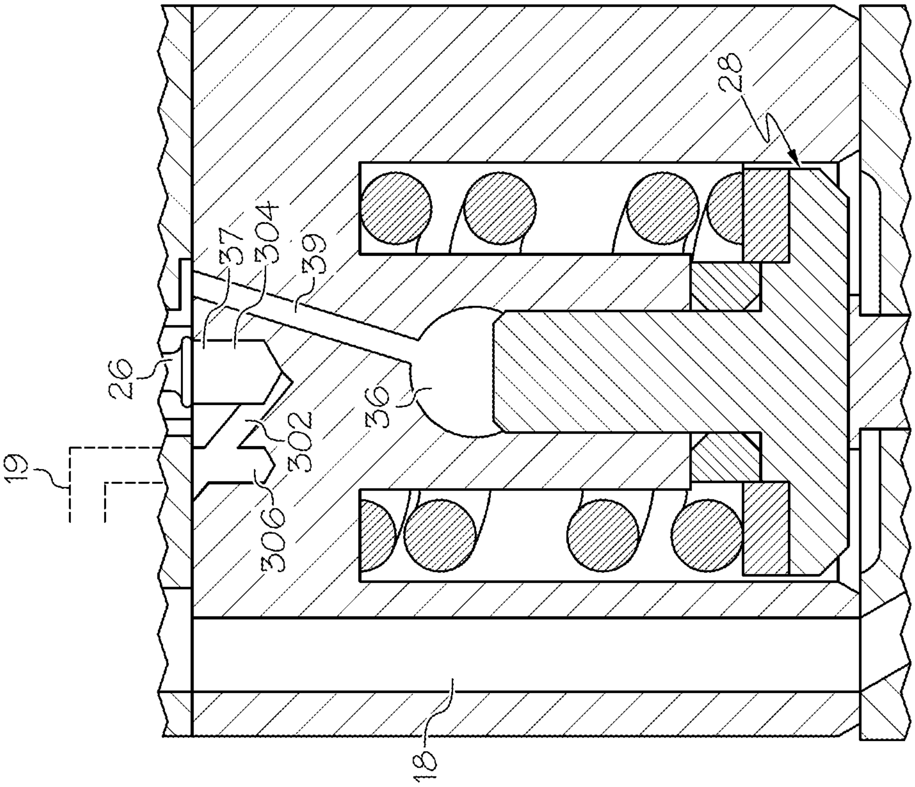
FIG. 5A is a partially schematic cross-sectional view of another embodiment of a fuel injection system including a check restricting orifice.

Referring now to FIG. 5A and FIG. 5B, another embodiment of a system for controlling an injection timing of a fuel injector 12 is shown. FIG. 5A shows a cross-section view of a portion of injector 12, while FIG. 5B is a top view with slight perspective, showing control member chamber 37. In this embodiment, the control valve member 26 acts to fluidly connect and disconnect a high pressure fuel supply 18 with the needle control chamber 36, as discussed above, for controlling the operation of the injection valve 28.

As shown in FIGS. 5A and 5B, the control member chamber 37 may include at least one orifice that fluidly connects the control member chamber 37 with a low pressure return line 19 of a fuel supply system. An orifice connecting chamber 37 to return line 19 may be a second orifice, with a first orifice being formed by connecting passage 302 shown in FIGS. 5A and 5B. However, if desired, the connecting passage 302 may be connected to return line 19 (e.g., via volume 306), as represented by FIG. 5A, with no additional orifice being formed in chamber 37 to connect the chamber 37 to a low pressure fuel return.

The control member chamber 37 may comprise a primary volume 304 and a secondary volume 306. Secondary volume 306 is, in at least some embodiments, smaller than the primary volume 304. The secondary volume 306 may be fluidly coupled with the primary volume 304 via a connecting passage 302. As shown in FIG. 5B, in some embodiments, the secondary volume 306 may include a throttling volume 308. The throttling volume 308 may form paths through which fuel may leak, in a controlled manner, the leaking fuel being guided to the low pressure fuel supply by a path (not shown) within injector 12.

The secondary volume 306 and the throttling volume 308 may be fluidly coupled to each other and may guide fluid to a wall or valve body of the fuel injector (shown only in FIG. 5B), which then may port the fluid to the low pressure fuel return. While FIG. 5B provides some perspective for illustration of secondary volume 306, as understood, volume 306 may include a bore that extends approximately parallel to an axial direction of injector 12, and approximately parallel to the primary volume 304. While there are two branches shown in the throttling volume 308 of secondary volume 306, each branch formed in an upper end surface of a valve body for injection valve 28, it is to be understood that embodiments are not limited to this arrangement and other embodiments with a different number of branches are contemplated. Additionally, while the throttling volume 308 is shown as a generally curved channel, in some embodiments the passages of the throttling volume 308 may be straight or another shape not depicted in the figures.

In some embodiments, the secondary volume 306 (which may include throttling volume 308) may effectively increase the total volume of the control member chamber 37 such that a timing of the start of injection via injection valve 28 is affected as compared to a control member chamber 37 having only the primary volume 304. That is, the secondary volume may increase the total volume, introduce backpressure, and/or restrict flow of high pressure fuel from chamber 36, thus reducing the initial speed of injection. In some embodiments, the secondary volume 306 (including throttling volume 308, when present) may increase the volume of the control member chamber 37 by between 10-100%, as compared to the volume of control member chamber 37 alone. In some embodiments, the volume 306 and, if present volume 308, may increase the volume of the control member chamber 37 by 20-90%. In some embodiments, the volumes 306 and 308, if present, may increase the volume of the control member chamber 37 by 40-60%. In some embodiments, the primary volume and/or the secondary volume may be milled channels. In some embodiments, the twin orifice passages may include a pair of curved orifices, which curved orifices may be generally symmetrical across an axis between the two curved orifices. In contrast to the previously-discussed embodiments, the position of the control valve member 26 does not affect the connection between the control member chamber 37 and the connecting passage 302.

INDUSTRIAL APPLICABILITY

The system 10 may be useful in various internal combustion engine systems including engine systems having fuel injectors with multiple solenoid-driven valves. System 10 may be utilized for generating power in a stationary machine (e.g., a generator or other electricity-generating device), in a mobile machine (e.g., an earthmoving device, a hauling truck, a drilling machine, a vehicle, etc.), or in other applications in which it is beneficial to monitor and control current applied to electronically-controlled fuel injector valves.

As injection begins, high pressure fuel in the needle control chamber 36 (FIG. 2) is allowed to flow through the pressure communication passage 39 and the orifice 49 in the control member chamber 37 to the relatively low pressure fuel supply system. Controlling the rate at which this pressurized fuel ports from the needle control chamber 36 and to the relatively low pressure fuel supply system will affect the rate of injection by modulating the pressure on the top hydraulic surface 31 of the needle valve 28. Accordingly, incorporation of the check-restricting orifice valves and the control member chamber having an increased total volume described herein may provide greater control of injection timing and injection volume using the injector 12. The check restricting orifice valves may slow down the opening of the injection valve 28, but still allow valve 28 to close quickly, resulting in a greater control of injection volume (or “shot size”), especially when a low injection volume is desired.

An engine system (e.g., fuel injection system 10), including a plurality of injectors 12, may be operated as part of a method. The method of operating the system 10 may include operating a control valve that is fluidly connected between a pressurized fuel supply passage and a needle control chamber. In some embodiments, the operation can include providing high pressure fuel to the needle control chamber 36 to keep the needle valve 28 in place, preventing fuel injection through the needle valve 28 and, subsequently, allowing the high pressure fuel to escape the needle control chamber 36 and drain through the control member chamber 37 via the orifice 49. Operation of the system 10 may enable the needle valve 28 to perform a controlled opening. The pressure communication passage 39 may include a two-way, variable flow rate valve (e.g., valve 100 or valve 200) that inhibits flow in a first direction and permits flow in a second direction to control the injection rate of the injection valve, the variable flow rate valve including a larger diameter channel and a smaller diameter channel.

The disclosed method and system may avoid the need for an end user, system assembler, or manufacturer, to adjust a timing and volume of injection to optimize the injection. The check restricting orifice and check restricting orifice valves described herein may reduce a shot volume to a desired volume and reduce a shot rate to a desired rate. This may reduce smoke produced by the engine, reduce noise and vibration, and otherwise improve performance. Controlling the dimensions and biases of the various components of the system will control the injection rate and shot size. The systems and methods described herein can be enabled through, in some cases, adjustments to preexisting valves or may be enabled by the formation of new components and arrangements of such components.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. An electronically controlled fuel injector comprising:

an injection valve;

a control valve fluidly connected between a pressurized fuel supply passage and a control chamber for controlling operation of the injection valve, the control valve movable between a non-injection position and an injection position;

the injection valve configured to inject fuel with the control valve in the injection position; and a control member chamber including an orifice that fluidly connects the control member chamber with a low pressure return line of a fuel supply system, wherein the control chamber is fluidly coupled with a pressure communication passage that extends between the control chamber and the control member chamber such that the control chamber is fluidly coupled with the low pressure return line through the orifice in the control member chamber when the control valve is in the injection position, and wherein the pressure communication passage includes a movable two-way, variable flow rate valve that inhibits flow in a first direction through the two-way, variable flow rate valve and permits flow in a second direction through the two-way, variable flow rate valve to control an injection rate of the injection valve, and wherein the two-way, variable flow rate valve includes a first channel and a second channel, in which the diameter of the second channel is larger than the diameter of the first channel.

2. The fuel injector of claim 1, wherein the movable two-way, variable flow rate valve is configured to move between a restrictive position and a permissive position based on whether the control valve is in an injection position or a non-injection position.

3. The fuel injector of claim 1, wherein when in the non-injection position, high pressure fuel is configured to pass through the second channel to port high pressure fuel to a top surface of the injection valve and, when in the injection position, fuel is configured to pass through the first channel to port fuel through the orifice of the control member chamber to a return line of the fuel supply system.

4. The fuel injector of claim 3, wherein the first channel is an orifice in an end face of the movable two-way, variable flow rate valve.

5. The fuel injector of claim 2, wherein the movable two-way, variable flow rate valve is configured to be in the permissive position at a beginning of injection.

6. The fuel injector of claim 2, wherein the movable two-way, variable flow rate valve is configured to be in the restrictive position at a beginning of injection.

7. The fuel injector of claim 2, wherein the movable two-way, variable flow rate valve is biased by gravity towards the permissive position.

8. The fuel injector of claim 7, wherein the movable two-way, variable flow rate valve is biased by a biasing mechanism against the force of gravity into the restrictive position.

9. The fuel injector of claim 4, wherein a flow path of high pressure fluid through the movable two-way, variable flow rate valve includes an approximately ninety-degree turn.

10. The fuel injector of claim 1, wherein the movable two-way, variable flow rate valve includes a central orifice that is cylindrical in shape.

11. A method of operating an engine system comprising:

operating a control valve that is fluidly connected between a pressurized fuel supply passage and a needle control chamber, operation including:

providing high pressure fuel to the needle control chamber to keep an injection valve in place, preventing fuel injection through the injection valve; and allowing the high pressure fuel to escape the needle control chamber through a pressure communication passage to a control member chamber including an orifice that fluidly connects the control member chamber with a low pressure return line of a fuel supply system to fluidly connect the needle control chamber with the low pressure return line to allow the injection valve to perform a controlled opening; wherein the pressure communication passage includes a movable two-way, variable flow rate valve that inhibits flow in a first direction and permits flow in a second direction to control an injection rate of the injection valve, the variable flow rate valve including a a first channel and a second channel, in which the diameter of the second channel is larger than the diameter of the first channel.

12. The method of claim 11, wherein the second channel and the first channel are approximately perpendicular to each other.

13. The method of claim 11, wherein the first channel is a channel formed in a bottom surface of the two-way, variable flow rate valve.

14. The method of claim 11, wherein the first direction and the second direction do not entirely overlap.

15. An electronically controlled fuel injector comprising:

an injection valve;

a control valve fluidly connected between a pressurized fuel supply passage and a control chamber for controlling operation of the injection valve, the control valve movable between a non-injection position and an injection position;

the injection valve configured to inject fuel with the control valve in the injection position; and a control member chamber including an orifice that fluidly connects the control member chamber with a low pressure return line of a fuel supply system, wherein the control chamber is fluidly coupled with a pressure communication passage that extends between the control chamber and the control member chamber such that the control chamber is fluidly coupled with the low pressure return line through the orifice in the control member chamber when the control valve is in the injection position, and wherein the pressure communication passage includes a movable two-way, variable flow rate valve, disposed fluidly between the control chamber and the control member chamber, that inhibits flow in a first direction through the two-way, variable flow rate valve and permits flow in a second direction through the two-way, variable flow rate valve to control an injection rate of the injection valve, and wherein the movable two-way, variable flow rate valve includes a first channel and a second channel, in which the diameter of the second channel is larger than the diameter of the first channel; and wherein the injection valve, the control valve and the two-way, variable flow rate valve all move along an axial direction of the fuel injector.

16. The fuel injector of claim 15, wherein the movable two-way, variable flow rate valve is configured to move between a restrictive position and a permissive position based on whether the control valve is in an injection position or a non-injection position.

17. The fuel injector of claim 15, wherein when in the non-injection position, high pressure fuel is configured to pass through the second channel to port high pressure fuel to a top surface of the injection valve and, when in the injection position, fuel is configured to pass through the first channel to port fuel through the orifice of the control member chamber to a return line of the fuel supply system.

18. The fuel injector of claim 17, wherein the first channel is an orifice in an end face of the movable two-way, variable flow rate valve.

19. The fuel injector of claim 16, wherein the movable two-way, variable flow rate valve is configured to be in the permissive position at a beginning of injection.

20. The fuel injector of claim 16, wherein the movable two-way, variable flow rate valve is configured to be in the restrictive position at a beginning of injection.

* * * * *